United States Patent Office 3,492,308
Patented Jan. 27, 1970

3,492,308
PROCESS FOR PREPARING METAL FREE PHTHALOCYANINES
Paul J. Brach, Rochester, N.Y., and Oliver A. Ossanna, Bloomington, Minn., assignors to Xerox Corporation, Rochester, N.Y., a corporation of New York
No Drawing. Filed Apr. 21, 1967, Ser. No. 632,571
Int. Cl. C09b 47/02; C07d 27/74
U.S. Cl. 260—314.5                                   7 Claims

ABSTRACT OF THE DISCLOSURE

A process for the preparation of beta metal-free phthalocyanine (substituted or unsubstituted) which comprises mixing under reaction conditions an initial reactant selected from the group consisting of phthalonitrile, substituted phthalonitriles, substituted and unsubstituted nitrogen derivatives of phthalic acid and mixtures thereof; a second reactant consisting of an amine; and a solvent consisting of an alkylalkanolamine.

---

This invention relates, in general, to a novel process for the preparation of an organic pigment and, more specifically, to a process for the preparation of phthalocyanine.

There have been known various methods for the production of images, such as photography, offset, xerography, and the like. In xerography, as disclosed by C. F. Carlson in U.S. Patent 2,297,691, a base plate of relatively low electrical resistance, such as metal, paper, etc., having a photoconductive insulating surface coated thereon, is electrostatically charged in the dark. The charged coating is then exposed to a light image. The charges leak off rapidly to the base plate in proportion to the intensity of light to which any given area is exposed. The charges are substantially retained in the non-exposed areas. After such exposure, the coating is contacted with electrostatic solid marking particles in the dark. These particles adhere to the areas where the electrostatic charges remain, forming a powder image corresponding to the electrostatic image. This method is further disclosed in U.S. Patents 2,659,670, 2,753,308, and 2,788,288. The powder image can be transferred to a sheet of transfer material, resulting in a positive or negative print as the case may be. Alternatively, where the base plate is relatively inexpensive, it may be desirable to fix the powder image directly to the plate itself. A full description of the xerographic process may be found in a book by Dessauer and Clark, entitled "Xerography and Related Processes."

In xerography, there are known many photoconductive materials, some of which function in a reusable system and others which function commercially only in a one-shot or disposable system. In the reusable system, while many photoconductors have been used or attempted, only selenium has found widespread commercial use in electrophotography.

Although selenium is the most desirable photoconductor known today for use in xerography, it does have some inherent disadvantages. One of the disadvantages of selenium is that it is not fully panchromatic. A second drawback to the use of selenium is the degree of difficulty encountered when depositing the selenium on a substrate to form a xerographic plate.

In U.S. Patent 2,663,636, Arthur Middleton disclosed various methods and means whereby any photoconductive insulating material in an insulating resin binder can be formed into an operable xerographic plate. In a copending application, Ser. No. 375,191, filed in the United States Patent Office on June 15, 1964, entitled "Electrographic Element," the use of phthalocyanine in a resin binder is disclosed as a xerographic plate. There are many advantages spelled out in this application especially directed to the use of phthalocyanine in a reusable xerographic system. Various phthalocyanines are disclosed as suitable for use in a xeropgraphic plate, as are many binders, both photoconductive and non-photoconductive.

There has recently been developed an electrophoretic imaging system capable of producing color images which utilizes electrically photosensitive particles, typically phthalocyanine. This process is described in detail in copending applications, Serial Nos. 384,737, 384,680, and 384,681, all filed July 23, 1964. In such an imaging system, various colored light absorbing particles are suspended in a non-conducting liquid carrier. The suspension is placed between electrodes, one of which is generally conductive called the "injecting" electrode and the other of which is generally insulating and called the "blocking" electrode. One of these electrodes is at least partially transparent. The suspension is subjected to a potential difference between the electrodes across the suspension and exposed to an image through said partially transparent electrode. As these steps are completed, selective particle migration takes place in image configuration, providing a visible image at one or both of the electrodes. An essential component of the system is the suspended particles which must be electrically photosensitive and which apparently undergo a net change in charge polarity upon exposure to activating electromagnetic radiation, through interaction with one of the electrodes.

In a monochromatic system, particles of a single color are used, producing a single-colored image equivalent to conventional black-and-white photography. In a polychromatic system, the images are produced in natural color because mixtures of particles of two or more different colors which are each sensitive to light of a specific wavelength or narrow range of wavelengths are used.

Phthalocyanine, also known as tetrabenzotetraazaporphin and tetrabenzoporphyrazine, may be said to be the condensation product of four isoindole groups. Metal-free phthalocyanine has the following general structure:

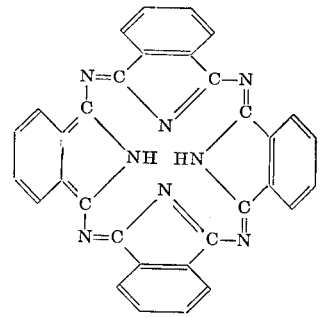

In addition to the metal-free phthalocyanine of the above structure, various metal derivatives of phthalocyanine are known in which the two hydrogen atoms in the center of the molecule are replaced by metals from any group of the periodic table. Further, it is well known that from one to sixteen of the peripheral hydrogen atoms in the four benzene rings of the phthalocyanine molecule may be replaced by halogen atoms and by numerous organic and inorganic groups.

In the preparation of metal-free phthalocyanine for xerographic and other electrostatic purposes, many difficulties have been encountered. The use of metal-free phthalocyanine in electrostatic applications places stringent requirements on the purity of this material. For example, it is required that the phthalocyanine intended for use in a xerographic plate generally be free of impurities or contaminants which in one way or another interfere with the xerographic system, whether it be in the charge acceptance or charge dissipation step or other steps in the electrographic process. Until now, phthalocyanine has been prepared almost exclusively for use as a pigment, where color, tinctorial strength, light fastness, dispersibility, etc. are prime considerations and purity is incidental. As a result, reported methods of synthesis (See "Phthalocyanine Compounds" by Moser and Thomas, Rheinhold Publishing Company, pages 104–189) often introduce metals or other complex organic materials as impurities which are difficult to remove. Two general methods have been used for the manufacture of phthalocyanine: (1) indirectly from an acid and a metal phthalocyanine containing a replaceable metal and (2) directly from phthalonitrile.

Methods that include forming a metal phthalocyanine with a replaceable metal which is subsequently removed with an acid are: heating phthalonitrile with a sodium alcoholate (U.S. Patent 2,116,602; British Patent 410,814; U.S. Patent 2,699,441), heating phthalonitrile with sodium cyanamide (U.S. Patent 2,154,912), heating phthalonitrile with sodium cyanamide and a solvent (U.S. Patent 2,182,763; British Patent 462,239), heating phthalonitrile with calcium metal in an alcohol or with calcium or barium oxides (U.S. Patent 2,202,632), heating phthalonitrile with calcium oxide and methylglucamine (U.S. Patent 2,413,191), heating phthalonitrile with an alcohol and sodium hydride (Swiss Patent 297,412; German Patent 933,047), heating phthalonitrile with magnesium and a solvent under pressure (British Patent 466,042; British Patent 482,387). Other methods for making labile metal phthalocyanines include those of Linstead's and Thorpe's early patents (U.S. Patent 2,000,051; U.S. Patent 2,000,052; British Patent 389,842) using cyanobenzamide or phthalamide as the phthalocyanine forming intermediate and magnesium metal. A magnesium phthalocyanine is apparently formed by the action of a Grignard reagent such as methyl magnesium iodide with phthalonitrile (British Patent 466,042; British Patent 480,249). The phthalocyanine may be prepared by a urea phthalic anhydride solvent process, but without ammonium chloride (U.S. Patent 2,197,459).

The above-mentioned methods of synthesis generally introduce metals which are difficult to remove. Methods of removing metal from labile phthalocyanines include: placing a solution of tin phthalocyanine in concentrated sulfuric acid, following by drowning in water (U.S. Patent 2,197,459), boiling an alkali or alkali earth metal phthalocyanine with hydrochloric acid (U.S. Patent 2,216,761), or stirring an alkali metal phthalocyanine with cold methyl alcohol, diluting with warm water, and filtering (U.S. Patent 2,214,454). Heating an alkali metal phthalocyanine with the ammonium salt of a strong acid converts it to beta phthalocyanine. (U.S. Patent 2,686,184).

One general method of preparing phthalocyanine which may avoid substantial metallic contaminants is to heat phthalonitrile to 350°–360° C. for 7 hours in a sealed vessel, (U.S. Patent 2,116,602; British Patent 410,814; U.S. Patent 2,153,620). A second method of synthesis which may avoid substantial metallic contaminants is to heat phthalonitrile in dimethylaniline or in quinoline solution while passing gaseous ammonia through the solution; temperatures are maintained in the vicinity of 250° C. (U.S. Patent 2,116,602; British Patent 410,814; U.S. Patent 2,153,620). A third method of synthesis which may avoid substantial metallic contaminants is to heat phthalonitrile with acetamide and/or formamide to the boil for 8 hours (U.S. Patent 2,182,763; British Patent 462,239; U.S. Patent 2,212,924; British Patent 457,526). A fourth method is to heat phthalonitrile with dihydroxybenzene, glycol, or glycerin. (British Patent 466,042.) A fifth method consists of heating phthalonitrile in an inert solvent in the presence of cyclohexylamine or piperidine (U.S. Patent 2,485,167). A sixth method is to heat phthalonitrile in a solvent with potassium carbonate, piperidine, and ethylene glycol. (U.S. Patent 2,485,167; U.S. Patent 2,485,168). Finally, a seventh method of synthesis of phthalocyanine which may avoid substantial metallic contaminants is to add a catalytic amount of triethanolamine to molten phthalonitrile at temperatures of 170° to 180° C. (U.S. Patent 2,155,054; British Patent 460,594).

While the above seven methods of phthalocyanine synthesis avoid the introduction of metal impurities, side reactions occur with a resulting lower yield of pigment due to the high temperatures at which these methods of synthesis are carried out. In addition, complex organic impurities are introduced. These organic impurities are difficult to remove and cannot be tolerated in the phthalocyanine compound when it is to be used for electrostatic purposes.

It is, therefore, an object of this invention to provide a method for the production of a substantially pure metal-free phthalocyanine devoid of the above-noted disadvantages.

It is another object of this invention to provide a direct method for the preparation of a metal-free phthalocyanine, without the use of metals or metallic salts, whereby substantially all contaminants in the final product are avoided.

It is another object of this invention to provide a direct method for the preparation of a metal-free phthalocyanine whereby the yield of the phthalocyanine is significantly improved.

It is still another object of this invention to provide a direct method for the preparation of a metal-free phthalocyanine whereby the final product has excellent properties for use in an electrostatic system.

It is still another further object of this invention to provide a less costly method for the preparation of metal-free phthalocyanine.

The foregoing objectives, and others, are accomplished in accordance with this invention, generally speaking, by providing a novel system for the preparation of a highly pure metal-free phthalocyanine, substituted or unsubstituted, which comprises mixing under reaction conditions phthalonitrile or substituted phthalonitriles or substituted or unsubstituted nitrogen derivatives of phthalic acid, an alkylalkanolamine, which acts as a solvent or liquid carrier during the reaction, and an amine. Although the reaction may be carried out at any suitable temperature, the range of about 120° to about 280° C. has been found convenient with phthalonitrile, certain substituted phthalonitriles, and certain substituted and unsubstituted nitrogen derivatives of phthalic acid. While any appropriate temperature may be used depending upon the components, or reactants selected for this system, it is preferred that a temperature generally in the range of about 100° to 150° C. be used, because at this temperature it is found that fewer side reactions occur and a purer product is obtained. Although any suitable solvent may be used in this system, it is preferred that 2-dimethylaminoethanol (reflux temperature, about 131° C. to 135° C.), 1-dimethylamino-2-propanol (reflux temperature, about 126° C.–127° C.), or 1-diethylamino-2-propanol (reflux temperature, about 153° C.–160° C.) be used, because higher yields of substantially pure phthalocyanine are obtained. Optimum results are obtained with 2-dimethylaminoethanol. In the present process, while phthalonitrile or any appropriate substituted phthalonitrile or substituted or unsubstituted nitrogen derivative of phthalic acid may be employed, it is preferred that phthalonitrile or phthalamide be used, in order to reduce side reactions and to thus obtain a higher yield of substantially pure metal-free phthalocyanine. Optimum results are obtained with phthalonitrile. Any proper amine may be employed in this process; however, it is preferred that gaseous ammonia or other low molecular weight amines be used because a purer end product is obtained. Furthermore, ammonia and other low molecular weight amines are widely available at a low cost. Optimum results are obtained with gaseous ammonia.

Any suitable solvent may be used in this system. Typical solvents are alkylalkanolamines such as 2-dimethylaminoethanol, 1-dimethylamino - 2 - propanol, 1-diethylamino-2-propanol, 2-dimethylamino-2-methyl-1-propanol, 2 - diethylaminoethanol, 3-dimethylamino-1-propanol, 2 (di-iso-propylamino) ethanol, 2-butylaminoethanol, 2-dibutylaminoethanol, 2[(2 - (diethylamino) ethyl) amino] ethanol, 2,2'-(butylimino) diethanol, 2-ethylaminoethanol, 2,2'-(ethylimino) diethanol, 2-methyl-aminoethanol, 2,2'-(methylimino) diethanol, 2-(iso-propylamino) ethanol, 2,2'(isopropylimino) diethanol, 2,2'-(tert.-butylimino) diethanol, and 3-diethylamino-1-propanol, among others.

In the present process phthalonitrile, substituted phthalonitriles, or any suitable nitrogen derivatives of phthalic acid may be used as a starting component. Typical nitrogen derivatives of phthalic acid are phthalimide, phthalamide, and o-cyanobenzamide among others. Typical substituted phthalonitriles are 4-pyridylphthalonitrile, and 4-nitrophthalonitrile, among others.

Any suitable amine may be used in the present process. Typical low molecular weight amines are methyl amine, ethyl amine and gaseous ammonia.

The following examples will further define various preferred embodiments of the present invention. Parts and percentages are by weight unless otherwise specified.

EXAMPLE I

Approximately 25 g. of purified phthalonitrile and approximately 100 ml. of 2-dimethylaminoethanol are placed in a 4-neck, 500 ml. round bottom flask equipped with a mechanical stirrer, reflux condenser, thermometer, and gas inlet tube. The suspension is heated until the phthalonitrile dissolves. Then a steady stream of ammonia gas is passed through the solution. The temperature is raised to reflux (about 131°–135° C.) and maintained for about 7 hours while the stream of ammonia gas is also maintained. The above mixture is then filtered hot and the residue, a blue pigment having a red reflex needle-like appearance, is washed thoroughly with water in order to remove alkanolamine traces and then with acetone in order to remove any unreacted phthalonitrile. Finally, it is air-dried to give glistening needles of beta metal-free phthalocyanine, containing impurities of less than 0.1%.

EXAMPLE II

Approximately 40 g. of purified phthalonitrile and approximately 120 ml. of 2-dimethylaminoethanol are placed in a 4-neck, 500 ml. round bottom flask equipped with a mechanical stirrer, reflux condenser, thermometer, and gas inlet tube. The suspension is heated until the phthalonitrile dissolves. Then a steady stream of ammonia gas is passed through the solution. The temperature is raised to reflux (about 131°–135° C.) and maintained for about 6 hours while the stream of ammonia gas is also maintained. The above mixture is then filtered and the residue is washed thoroughly, first with water and then with acetone, and finally, it is air-dried. The resulting product consists of extremely pure beta metal-free phthalocyanine containing impurities of less than 0.1%.

EXAMPLE III

Approximately 250 g. of purified phthalonitrile and approximately 1000 ml. of 1-dimethylamino-2-propanol are placed in a 4-neck, 5 l. flask equipped with a mechanical stirrer, reflux condenser, thermometer, and gas inlet tube. The suspension is heated until the phthalonitrile dissolves. Then a steady stream of gaseous methyl amine is passed through the solution. The temperature is raised to reflux (about 126°–127° C.) and maintained for approximately 8 hours while the stream of methyl amine gas is also maintained. The above mixture is then filtered hot, washed thoroughly first with acetone and then with methanol, and dried in a vacuum for approximately 7 hours at about 55° C. The resulting product consists of extremely pure beta metal-free phthalocaynine, containing impurities of less than 0.1%.

EXAMPLE IV

Approximately 50 g. of o - cyanobenzamide and approximately 200 ml. of 1 - diethylamino - 2 - propanol are placed in a 4 - neck, 500 ml. round bottom flask equipped with a mechanical stirrer, reflux condenser, thermometer, and gas inlet tube. The suspension is heated until the o - cyanobenzamide dissolves. Then a steady stream of gaseous ethyl amine is passed through the solution. The temperature is raised to reflux (about 153°–160° C.) and maintained for about 6 hours while the stream of ethyl amine gas is also maintained. The above mixture is then filtered and the residue is washed thoroughly first with ethanol and then with acetone, and finally, it is air-dried. The resulting product consists of extremely pure beta metal-free phthalocyanine, containing impurities of less than 0.1%.

EXAMPLE V

Approximately 25 g. of phthalamide and approximately 125 ml. of 1 - diethylamino - 2 - propanol are placed in a 4 - neck, 500 ml. round bottom flask equipped with a mechanical stirrer, reflux condenser, thermometer, and gas inlet tube. The suspension is heated until the phthalamide dissolves. Then a steady stream of gaseous ammonia is passed through the solution. The temperature is raised to reflux (about 153°–160° C.) and maintained for about 8 hours while the stream of ammonia gas is also maintained. The above mixture is then filtered hot and the residue is washed thoroughly first with methanol and then with acetone, and finally, it is air-dried. The resulting product consists of extremely pure beta metal-free phthalocyanine, containing impurities of less than 0.1%.

EXAMPLE VI

Approximately 50 g. of phthalimide and approximately 230 ml. of 2 - dimethylaminoethanol are placed in a 4 - neck, 500 ml. round bottom flask equipped with a mechanical stirrer, reflux condenser, thermometer, and gas inlet tube. The suspension is heated until the phthalimide dissolves. Then a steady stream of gaseous methyl amine is passed through the solution. The temperature is raised to reflux (about 131°–135° C.) and maintained for approximately 7 hours while the stream of methyl amine gas is also maintained. The above mixture is then filtered and the residue is washed thoroughly first with ethanol and then with acetone, and dried in a vacuum for approximately 8 hours at about 50° C. The resulting product consists of extremely pure beta metal-free phthalocyanine, containing impurities of less than 0.1%.

EXAMPLE VII

Approximately 60 g. of purified phthalonitrile and approximately 240 ml. of 2 - dimethylamino - 2 - methyl - 1 - propanol are placed in a 4 - neck, 500 ml. round bottom flask equipped with a mechanical stirrer, reflux condenser, thermometer, and gas inlet tube. The suspension is heated until the phthalonitrile dissolves. Then a steady stream of gaseous ethyl amine is passed through the solution. The temperature is raised to reflux (about 159°–161° C.) and maintained for approximately 6 hours while the stream of ethyl amine gas is also maintained. The above mixture is filtered and the residue is washed thoroughly first with water and then with acetone, and finally, it is air-dried. The resulting product consists of extremely pure beta metal-free phthalocyanine, containing impurities of less than 0.1%.

EXAMPLE VIII

Approximately 100 g. of phthalimide and approximately 460 ml. of 2 - diethylaminoethanol are placed in a 4 - neck, 5 l. flask equipped with a stirrer, reflux condenser, thermometer, and gas inlet tube. The suspension is heated until the phthalimide dissolves. Then a steady stream of ammonia gas is passed through the solution. The temperature is raised to reflux (about 161°–163° C.) and maintained for approximately 6 hours while the stream of ammonia gas is also maintained. The above mixture is filtered hot and the residue is washed thoroughly first with acetone, and then with methanol, and finally, it is air-dried. The resulting product consists of extremely pure beta metal-free phthalocyanine, containing impurities of less than 0.1%.

EXAMPLE IX

Approximately 50 g. of phthalamide and approximately 125 ml. of 3 - dimethylamino - 1 - propanol are placed in a 4 - neck, 500 ml. round bottom flask equipped with a stirrer, reflux condenser, thermometer, and gas inlet tube. The suspension is heated until the phthalamide dissolves. Then a steady stream of gaseous methyl amine is passed through the solution. The temperature is raised to reflux (about 165°–167° C.) and maintained for approximately 7 hours while the methyl amine gas is also maintained. The above mixture is filtered, and the residue is washed thoroughly first with ethanol and then with acetone, and finally, it is air-dried. The resulting product consists of extremely pure beta metal-free phthalocyanine, containing impurities of less than 0.1%.

EXAMPLE X

Approximately 25 g. of o-cyanobenzamide and approximately 100 ml. of 2 - (di - iso - propylamino) ethanol are placed in a 4 - neck, 500 ml. round bottom flask equipped with a stirrer, reflux condenser, thermometer, and gas inlet tube. The suspension is heated until the o-cyanobenzamide dissolves. Then a steady stream of gaseous ammonia is passed through the solution. The temperature is raised to reflux (about 191°–193° C.) and maintained for approximately 6 hours while the ammonia gas is also maintained. The above mixture is filtered, and the residue is washed thoroughly first with methanol and then with acetone, and finally, it is air-dried. The resulting product consists of extremely pure beta metal-free phthalocyanine, containing impurities of less than 0.1%.

EXAMPLE XI

Approximately 35 g. of purified phthalonitrile and approximately 140 ml. of 2-butylaminoethanol are placed in a 4-neck, 500 ml. round bottom flask equipped with a stirrer, reflux condenser, thermometer and gas inlet tube. The suspension is heated until the phthalonitrile dissolves. Then a steady stream of gaseous ethyl amine is passed through the solution. The temperature is raised to reflux (about 200°–202° C.) and maintained for about 8 hours while the stream of ethyl amine gas is also maintained. The above mixture is then filtered and the residue is washed thoroughly first with ethanol and then with acetone, and finally, it is air-dried. The resulting product consists of extremely pure beta metal-free phthalocyanine, containing impurities of less than 0.1%.

EXAMPLE XII

Approximately 30 g. of phthalamide and approximately 150 g. of 2-dibutylaminoethanol are placed in a 4-neck, 500 ml. round bottom flask equipped with a stirrer, reflux condenser, thermometer and gas inlet tube. The suspension is heated until the phthalamide dissolves. Then a steady stream of ammonia gas is passed through the solution. The temperature is raised to reflux (about 230° C.) and maintained for 9 hours while the stream of ammonia gas is also maintained. The above mixture is filtered and the residue is washed thoroughly first with acetone and then with methanol, and finally, it is air-dried. The resulting product consists of extremely pure beta metal-free phthalocyanine, containing impurities of less than 0.1%.

EXAMPLE XIII

Approximately 25 g. of phthalimide and approximately 115 ml. of 2-(2-(diethylamino) ethyl) amino ethanol are placed in a 4-neck, 500 ml. round bottom flask equipped with a stirrer, reflux condenser, thermometer, and gas inlet tube. The suspension is heated until the phthalimide dissolves. Then a steady stream of gaseous ammonia is passed through the solution. The temperature is raised to reflux (about 240°–243° C.) and maintained for approximately 7 hours while the stream of ammonia gas is also maintained. The above mixture is filtered and the residue is washed thoroughly first with water and then with acetone, and finally, it is air-dried. The resulting product consists of extremely pure beta metal-free phthalocyanine, containing impurities of less than 0.1%.

EXAMPLE XIV

Approximately 45 g. of o-cyanobenzamide and 180 ml. of 2-2'-(butylimino) diethanol are placed in a 4-neck, 500 ml. round bottom flask equipped with a mechanical stirrer, reflux condenser, thermometer, and gas inlet tube. The suspension is heated until the o-cyanobenzamide dissolves. Then a steady stream of ammonia gas is passed through the solution. The temperature is raised to reflux (about 274°–276° C.) and maintained for about 8 hours while the stream of ammonia gas is also maintained. The above mixture is then filtered, and the residue is washed thoroughly first with ethanol and then with acetone, and dried in a vacuum for approximately 8 hours at about 55° C. The resulting product consists of extremely pure beta metal-free phthalocyanine, containing impurities of less than 0.1%.

EXAMPLE XV

Approximately 25 g. of purified 4-pyridylphthalonitrile and approximately 90 ml. of 2-dimethylaminoethanol are placed in a 4-neck, 500 ml. round bottom flask equipped with a mechanical stirrer, reflux condenser, thermometer, and gas inlet tube. The suspension is heated until the 4-pyridylphthalonitrile dissolves. Then a steady stream of ammonia gas is passed through the solution. The temperature is raised to reflux (about 131°–135° C.) and maintained for about 6 hours while the stream of ammonia gas is also maintained. The above mixture is then filtered and the residue (tetra-(4)-pyridylphthalocyanine) is first washed thoroughly with water and then with acetone. Finally, it is air-dried. The resulting product consists of extremely pure tetra-(4)-pyridylphthalocyanine, containing impurities of less than 0.1%.

EXAMPLE XVI

Approximately 40 g. of purified 4-nitrophthalonitrile and approximately 160 ml. of 1-dimethylamino-2-propanol are placed in a 4-neck, 500 ml. round bottom flask equipped with a mechanical stirrer, reflux condenser, thermometer, and gas inlet tube. The suspension is heated until the 4-nitrophthalonitrile dissolves. Then a steady stream of gaseous ethyl amine is passed into the solution. The temperature is raised to reflux (about 126°–127° C.) and maintained for approximately 7 hours while the stream of ethyl amine gas is also maintained. The above mixture is then filtered and the residue (tetra-(4)-nitrophthalocyanine) is washed thoroughly first with ethanol and then with acetone, and finally, it is air-dried. The resulting product consists of extremely pure tetra-(4)-nitrophthalocyanine, containing impurities of less than 0.1%.

EXAMPLE XVII

Approximately 30 g. of purified 4-chlorophthalonitrile and approximately 120 ml. of 2-dimethylamino-2-methyl-1-propanol are placed in a 4-neck, 500 ml. round bottom flask equipped with a mechanical stirrer, reflux condenser, thermometer, and gas inlet tube. The suspension is heated until the 4-chlorophthalonitrile dissolves. Then a steady stream of gaseous methyl amine is passed through the solution. The temperature is raised to reflux and maintained for approximately 5 hours while the stream of methyl amine gas is also maintained. The above mixture is then filtered hot and the residue (tetra - (4) - chlorophthalocyanine) is first washed thoroughly with methanol and then with acetone, and dried in vacuum for approximately 7 hours at about 50° C. The resulting product consists of extremely pure tetra - (4) - chlorophthalocyanine, containing impurities of less than 0.1%.

The phthalocyanine in Examples 1 through 14 above is isolated from the reaction mixture in the beta crystalline form. It has excellent purity as evidenced by elemental analysis. The principal contaminant using this method is unreacted starting material. When allowance is made for this unreacted material, the yield of phthalocyanine approaches 90%. Since starting materials may be recovered efficiently, this may be raised by recycling.

While specific components of the present system are defined in the working examples above, any of the other typical materials indicated above may be substituted in the working examples if appropriate. In addition, many other variables may be introduced in the present process such as further purification steps or other reaction components which may in any way affect, enhance, or otherwise improve the present process.

While various specifics are given in the present application, many modifications and ramifications will occur to those skilled in the art upon a reading of the present disclosure.

What is claimed is:

1. The process for the preparation of a substituted or unsubstituted metal-free phthalocyanine which comprises the following steps:
   (a) mixing an initial reactant selected from the group consisting of phthalonitrile, substituted phthalonitriles, substituted and unsubstituted nitrogen derivatives of phthalic acid and mixtures thereof and a solvent comprising an alkylalkanolamine;
   (b) heating a mixture of said initial reactant and said alkylalkanolamine until the former is dissolved;
   (c) introducing a second reactant comprising an amine into said mixture;
   (d) heating to reflux and maintaining the reflux until the reaction is complete.

2. The process according to claim 1 in which said initial reactant is selected from the group consisting of phthalonitrile, phthalamide, phthalimide, o-cyanobenzamide, 4-pyridylphthalonitrile, 4-nitrophthalonitrile, and 4-chlorophthalonitrile.

3. The process according to claim 1 in which said second reactant is a low molecular weight amine.

4. The process according to claim 1 in which said alkylalkanolamine is selected from the group consisting of 2-dimethylaminoethanol, 1-dimethylamino-2-propanol, and 1-diethylamino-2-propanol.

5. The process according to claim 1 in which said initial reactant is phthalonitrile.

6. The process according to claim 1 in which said second reactant is ammonia.

7. The process according to claim 1 in which said alkylalkanolamine is 2-dimethylaminoethanol.

No references cited.

HENRY R. JILES, Primary Examiner

H. I. MOATZ, Assistant Examiner

U.S. Cl. X.R.

260—296